United States Patent
Winget et al.

(10) Patent No.: US 9,205,753 B2
(45) Date of Patent: Dec. 8, 2015

(54) PLASTIC PART SUCH AS AN AUTOMOTIVE VEHICLE INTERIOR PLASTIC PART HAVING A DAMPENING SUPPORT SURFACE CAPABLE OF WIRELESSLY AND CONDUCTIVELY ALLOWING ELECTRICAL SIGNALS TO TRAVEL BETWEEN THE PART AND AN ELECTRICAL DEVICE ARBITRARILY POSITIONED AND SUPPORTED ON THE SURFACE

(71) Applicant: GLOBAL IP HOLDINGS, LLC, Sterling Heights, MI (US)

(72) Inventors: Larry J. Winget, Leonard, MI (US); Darius J. Preisler, Macomb, MI (US); Christopher A. Heikkila, Washington Township, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 125 days.

(21) Appl. No.: 14/050,513

(22) Filed: Oct. 10, 2013

(65) Prior Publication Data
US 2014/0035523 A1    Feb. 6, 2014

Related U.S. Application Data

(63) Continuation-in-part of application No. 13/832,124, filed on Mar. 15, 2013, which is a continuation-in-part of application No. 13/438,335, filed on Apr. 3, 2012.

(51) Int. Cl.
*B60L 11/18* (2006.01)
*H04B 1/3816* (2015.01)
*H04B 5/00* (2006.01)
*H04B 1/3822* (2015.01)

(52) U.S. Cl.
CPC ............ *B60L 11/182* (2013.01); *H04B 1/3816* (2013.01); *H04B 5/0037* (2013.01); *H04B 1/3822* (2013.01); *H04B 5/0075* (2013.01)

(58) Field of Classification Search
CPC .................................. H02J 7/025; B60R 1/00
USPC ......................... 307/104, 9.1, 10.1; 439/626
See application file for complete search history.

(56) References Cited

U.S. PATENT DOCUMENTS

| | | |
|---|---|---|
| 3,205,618 A | 9/1965 | Heytow |
| 3,978,934 A | 9/1976 | Schneidinger |
| 4,324,301 A | 4/1982 | Eyerly |
| 5,868,076 A | 2/1999 | Myus et al. |
| 5,977,489 A | 11/1999 | Crotzer et al. |
| 6,044,767 A | 4/2000 | Myus et al. |
| 6,180,221 B1 * | 1/2001 | Crotzer et al. ............. 428/317.9 |

(Continued)

OTHER PUBLICATIONS

Office Action; corresponding U.S. Appl. No. 13/438,335; notification date Mar. 20, 2015.

(Continued)

*Primary Examiner* — Jared Fureman
*Assistant Examiner* — James P Evans
(74) *Attorney, Agent, or Firm* — Brooks Kushman P.C.

(57) ABSTRACT

A plastic part such as an automotive vehicle interior plastic part having a dampening support surface is provided. The surface is capable of wirelessly and conductively allowing electrical signals including power signals to travel between the part and an electrical device such as a cell phone arbitrarily positioned and supported on the surface during vehicle motion.

22 Claims, 5 Drawing Sheets

(56) References Cited

U.S. PATENT DOCUMENTS

| | | | |
|---|---|---|---|
| 6,396,925 B1 | 5/2002 | Close | |
| 6,475,937 B1 * | 11/2002 | Preisler et al. | 442/370 |
| 6,539,358 B1 | 3/2003 | Coon et al. | |
| 6,827,318 B1 | 12/2004 | Hsu Li | |
| 6,917,182 B2 | 7/2005 | Burton et al. | |
| 7,065,658 B1 | 6/2006 | Baraban et al. | |
| 7,116,215 B2 * | 10/2006 | Oonishi | 340/436 |
| 7,172,196 B2 | 2/2007 | Randall | |
| 7,272,984 B2 | 9/2007 | Fan | |
| 7,399,202 B2 | 7/2008 | Dayan et al. | |
| 7,654,683 B2 | 2/2010 | Ellis | |
| 7,868,585 B2 | 1/2011 | Sarnowski et al. | |
| 7,932,638 B2 | 4/2011 | Randall | |
| 7,952,320 B2 | 5/2011 | Bersenev | |
| 7,982,436 B2 | 7/2011 | Randall | |
| 7,986,059 B2 | 7/2011 | Randall | |
| 8,081,408 B2 | 12/2011 | Randall | |
| 8,145,821 B2 | 3/2012 | Mead et al. | |
| 8,235,826 B2 | 8/2012 | Randall | |
| 2003/0013500 A1 | 1/2003 | Dunoff et al. | |
| 2005/0162133 A1 | 7/2005 | Aisenbrey | |
| 2006/0066088 A1 * | 3/2006 | Hier et al. | 280/743.1 |
| 2006/0278788 A1 | 12/2006 | Fan | |
| 2008/0019082 A1 | 1/2008 | Krieger et al. | |
| 2010/0156197 A1 | 6/2010 | Randall | |
| 2011/0006611 A1 * | 1/2011 | Baarman et al. | 307/104 |
| 2011/0084655 A1 | 4/2011 | Hui et al. | |
| 2011/0128686 A1 | 6/2011 | Moreshead | |
| 2011/0227527 A1 | 9/2011 | Zhu et al. | |
| 2011/0241608 A1 | 10/2011 | Adamczyk et al. | |
| 2013/0333941 A1 * | 12/2013 | Snider | 174/535 |

OTHER PUBLICATIONS

Office Action; corresponding U.S. Appl. No. 13/526,855; notification date Mar. 27, 2015.

Office Action; corresponding U.S. Appl. No. 13/832,124; notification date Apr. 27, 2015.

* cited by examiner

From Power Source

PLASTIC PART SUCH AS AN AUTOMOTIVE VEHICLE INTERIOR PLASTIC PART HAVING A DAMPENING SUPPORT SURFACE CAPABLE OF WIRELESSLY AND CONDUCTIVELY ALLOWING ELECTRICAL SIGNALS TO TRAVEL BETWEEN THE PART AND AN ELECTRICAL DEVICE ARBITRARILY POSITIONED AND SUPPORTED ON THE SURFACE

CROSS-REFERENCE TO RELATED APPLICATIONS

This application is a continuation-in-part of U.S. application Ser. No. 13/832,124 filed Mar. 15, 2013, which, in turn, is a continuation-in-part of U.S. application Ser. No. 13/438,335 filed Apr. 3, 2012.

TECHNICAL FIELD

This invention generally relates to the wireless and conductive transfer of electrical signals to and from electrical devices and in particular, to plastic parts such as automotive interior plastic parts which are capable of such transfer.

OVERVIEW

Wireless charging of portable electronic devices has been known for some time. Examples of such wireless charging are shown in U.S. Pat. No. 7,986,059 and 2010/0156197.

Wireless charging of electrical/electronic devices can be done conductively or inductively. Conductive charging requires a physical connection between the electronic device's battery and the power supply. The need for a metal-to-metal connection between the charger and the device requiring charging is one of the main drawbacks of this method. To accomplish this without the use of physical cords connected to wall outlets, special attachments are made from electronic devices which are fitted with a detector that can detect when the device makes connection with the power source, often a charging base. Conduction-based wireless accessories may include changeable backs for cellular phones, special sleeves and attachable clips. The electronic devices, fitted with these accessories, are simply placed on the charging base. The base is able to detect when a compatible device has been placed on it and begin the battery charging process. These charging bases are usually designed to be able to distinguish between human and metal contact so that there is no risk of electrocution.

There are a number of problems affecting the passage of current between contact surfaces such as: surface finish; wear; arc erosion; contamination; oxidation; silicone contamination; frettage and frottage corrosion; and contact bounce.

Many of the above-noted problems result in a reduction in electrical contact area which increases electrical resistance and results in much higher operating temperatures at the contact surfaces causing inefficient operation and damage to the contacts themselves.

An uneven contact surface will wear on the contact areas. Debris from abrasion and erosion will collect in any cavity in the contact areas, oxidize, and further reduce contact surface area and increase abrasion.

An attribute of some of the wire-free conductive power delivery systems includes combinations of power delivery pad configurations and power receiver contact configurations that ensure wire-free power transfer from the power pads to the electronic devices, regardless of the location or orientation at which the mobile electronic device with its power receiver contacts may be positioned on the power delivery pad. For example, for a power delivery pad with an array of square power surfaces, each one being opposite in polarity to each laterally adjacent power surface, a power receiver contact configuration or constellation comprising at least five contacts equally spaced in a circle (pentagon configuration) of appropriate size in relation to the square power surfaces.

In another example, for a power delivery pad with an array of elongated, parallel power surfaces or strips, each one of which is opposite in polarity to each adjacent strip, a power receiver contact configuration or constellation comprising at least four contacts, three of which are at points of an equilateral triangle and the fourth of which is at the center of the equilateral triangle of appropriate size in relation to the elongated rectangular power surfaces, can ensure power transfer, regardless of location or orientation of the constellation of power receiver contacts on the power delivery pad.

An example prior art charging pad and enabled power receiving device are shown in FIG. 3. The charging pad transfers power wirelessly or wire-free, i.e., without a charging adapter cord, to one or more devices resting on it. In this context, the terms "wireless", "wirelessly", and "wire-free" are used to indicate that charging of the device is achieved without a cord-type electric charging unit or adapter, and in the example of FIG. 3, is achieved with through electrical conduction through contacts with selective geometry. Wireless in this context can be interfacing contacts as will be explained below. Also, the term "enabled" device is used for convenience to mean an electronic or electrically powered device, for example, cell phone, computer, radio, camera, personal digital assistant, digital recorder and playback device, hearing aid, GPS receiver or transmitter, medical instrument, or just about any other portable device, that is equipped with charging contacts and associated electronic circuitry to enable the device to be electrically charged by the power pad component.

The top surface of the charging pad may comprise an array of contact strips which are energized with low voltage DC or AC or grounded so that every other strip is at a different voltage, e.g., one set of strips are positive and the strips in-between the positive strips are negative or ground potential, or vice versa.

On the underside of one example enabled device there are a plurality of conduction contact points arranged in a "constellation" configuration or pattern. One example constellation pattern comprises four contacts arranged with three of the contacts defining the vertices of an equilateral triangle and the fourth contact in the middle of the equilateral triangle. This pattern is sometimes referred to as a tetrahedron pattern because the four contacts are positioned as the vertices of a tetrahedron would appear in a top plan view of a tetrahedron.

The contact constellation on the enabled device of FIG. 3 and the contact strip array on the charging pad form a geometrically complementary pair with the property that electrical power can be transferred from the pad into the device regardless of the position and orientation of each particular device on the pad. The particular number, geometric size, and arrangement of the contacts is not the subject of this invention. Suffice it to say that they can be sized, arranged, and shaped to transfer power from the power delivery surface of the charging pad or part or to an enabled charge receiving device.

With appropriate sizing, no matter where or at which orientation the constellation is set on the pad, at least one positive and one negative contact will be made, thus electrical power can be transferred from the pad to the enabled device. Power can be extracted from the contacts using a rectifier, the output of which is approximately equal to the electrical potential between contract strips or pads of the power delivery surface after allowing for some losses in the rectifier circuit. The rectifier can be a bridge rectifier enabled with diodes (not shown) that also inherently prevents the exposed contacts on the mobile or enabled device from being "live" when they are separated or removed from the charging pad. In other words, the diodes in the rectifier between the contacts on the enabled device and the rechargeable battery or capacitor in the enabled device prevents electric current from flowing from the rechargeable battery or capacitor of the device to the contacts.

In this architecture, the voltage on the power delivery surface of the charging pad is fixed and independent of the devices resting on the pad surface. Each individual device that gets positioned on the charging pad is responsible for conditioning the electric power obtained from the charging pad to power that is appropriate for its own use. This scheme inherently allows for multiple devices of various manufacturers with various power requirements to be charged from the same charging pad.

Inductive charging involves the use of an induction coil which produces an electromagnetic field via a charging station where energy is transferred to an electronic device which is also equipped with a corresponding induction coil. The electronic device receives the energy from the magnetic field and then reconverts it into usable electrical current which charges the device's battery and a second induction coil in the portable device takes power from the electromagnetic field and converts it back into electrical current to charge the battery.

Some of the disadvantages associated with inductive charging are as follows:

Lower efficiency, waste heat—Important disadvantages of inductive charging include its lower efficiency and increased resistive heating in comparison to direct contact. Implementations using lower frequencies or older drive technologies charge more slowly and generate heat within most portable electronics.

More costly—Inductive charging also requires drive electronics and coils in both device and charger, increasing the complexity and cost of manufacturing.

Slower charging—due to the lower efficiency, devices can take longer to charge when supplied power is equal.

Inconvenience—When a mobile device is connected to a cable, it can be freely moved around and operated while charging. In current implementations of inductive charging the mobile device must be left on a pad, and thus cannot be moved around or easily operated while charging.

Incompatability—There are no de facto standards, potentially leaving a consumer, organization or manufacturer with redundant equipment when a standard emerges.

In August 2009, a consortium of interested companies called the Wireless Power Consortium announced they were nearing completion for a new industry standard for low-power inductive charging called "Qi".

Wireless charging of portable electronic devices in vehicles such as automotive vehicles has the potential to keep one's device fully powered up on the road, with no cords to clutter up the car. Depending on the make and model, wireless charging may even fully integrate one's phone with the car's audio system and touchscreen, allowing voice access to the phone's music and address book or quick access through the dashboard screen.

Wireless charging in automotive vehicles has the potential to be both a convenience and a potential way to reduce driver distraction depending upon how carmakers integrate it into a vehicle. If the charging pad is located in a compartment hidden out of sight, for example, and allows a driver to access their device only through voice controls or larger buttons on the car's touch screen, distraction could be reduced.

Plastic parts such as automotive interior plastic parts must satisfy a wide variety of environmental and safety regulations including the need for such parts to be recyclable. Because of the potentially large volume of automotive vehicles that are produced year after year, automotive interior parts must be produced in a cost-effective fashion without the need for elaborate and costly manufacturing facilities.

There are a number of problems associated with the above-noted prior art especially if the disclosed power pads are to be used in an automotive interior environment. For example, automotive interior parts can experience wide temperature swings, (i.e. −30° to 85° C.) a relatively high service temperature (i.e. 85° C.) and are subject to shock and vibration not normally experienced in a controlled home or office environment. Also, objects supported on generally horizontal support surfaces of automotive interior parts experienced various forces (i.e., acceleration, deceleration and/or centrifugal) which urge the objects to shift, slide or roll on the support surfaces in response to the motion of the vehicle.

SUMMARY OF EXAMPLE EMBODIMENTS

An object of at least one embodiment of the present invention is to provide a plastic part such as an automotive vehicle interior plastic part having a dampening support surface capable of wirelessly and conductively allowing electrical signals to travel between the part and an electrical device arbitrarily positioned and supported on the surface.

In carrying out the above object and other objects of at least one embodiment of the present invention, an automotive vehicle interior plastic part having a dampening support surface capable of wirelessly and conductively allowing electrical signals to travel between the part and an electrical device arbitrarily positioned and supported on the surface is provided. The part includes a substrate molded from an insulating material in a molding process. The part also includes a dampening first member bonded to the substrate and formed from a first non-metallic conductive material molded onto the insulating material in the molding process. The first member forms a first part of the support surface. A dampening second member is bonded to the substrate and is formed from a second non-metallic conductive material molded onto the insulating material in the molding process. The second member forms a second part of the support surface. The substrate electrically insulates the first member from the second member. The first and second members dampen vibration and shock at the support surface and allow electrical signals to travel between the part and the device during vehicle motion.

The electrical signals may include electrical power signals wherein the device includes a rechargeable battery.

The electrical signals may provide data communication between the part and the device.

The molding process may be an injection molding process.

The injection molding process may comprise an insert molding process or the injection molding process may comprise a multi-shot molding process.

Each of the first and second non-metallic conductive materials may comprise an electrically conductive elastomer.

Each of the electrically conductive elastomers may comprise an electrically conductive thermoplastic elastomer.

The first member may be formed as a first integral, unitary, conductive structure including a first base portion and a first set of surface-defining portions. Each of the first set of the surface-defining portions and the first base portion may include particles of a first filler dispersed therein in a concentration sufficient to provide a substantially continuous conductive path in the first member.

The second member may be formed as a second integral, unitary, conductive structure including a second base portion and a second set of surface-defining portions. Each of the second set of surface-defining portions and the second base portion may include particles of a second filler disbursed therein in a concentration sufficient to provide a substantially continuous conductive path in the second member.

The first and second sets of surface-defining portions may be sized, shaped and arranged laterally adjacent to each other in a pattern at the support surface in relation to a predetermined distribution of contacts on the device to achieve wireless conductive signal transfer between the device and the part in various positions and orientations of the device when supported on the support surface.

Each of the first and second non-metallic conductive materials may comprise an electrically conductive elastomer.

Each of the electrically conductive elastomers may comprise an electrically conductive thermoplastic elastomer.

The first member may be formed as a first integral, unitary, conductive structure including a first base portion and a first set of surface-defining portions. Each of the first set of the surface-defining portions and the first base portion may include particles of a first filler dispersed therein in a concentration sufficient to provide a substantially continuous conductive path in the first member.

The second member may be formed as a second integral, unitary, conductive structure including a second base portion and a second set of surface-defining portions. Each of the second set of surface-defining portions and the second base portion may include particles of a second filler disbursed therein in a concentration sufficient to provide a substantially continuous conductive path in the second member.

The first and second sets of surface-defining portions may be sized, shaped and arranged laterally adjacent to each other in a pattern at the support surface in relation to a predetermined distribution of contacts on the device to achieve wireless conductive signal transfer between the device and the part in various positions and orientations of the device when supported on the support surface.

The first conductive structure may include a first coupling portion electrically coupled to the first base portion and being operable for biasing the first set of surface-defining portions at a first voltage level.

The second conductive structure may include a second coupling portion electrically coupled to the second base portion and being operable for biasing the second set of surface-defining portions at a second voltage level different from the first voltage level.

The first and second sets of surface-defining portions may be interdigitated.

Further in carrying out the above object and other objects of at least one embodiment of the present invention, a vehicular charging pad having a dampening support surface capable of wirelessly and conductively charging an electrical device arbitrarily positioned and supported on the surface is provided. The pad includes a substrate molded from an insulating material in a molding process. The pad also includes a dampening first member bonded to the substrate and formed from a first non-metallic conductive material molded onto the insulating material in the molding process. The first member forms a first part of the support surface. The pad further includes a dampening second member bonded to the substrate and formed from a second non-metallic conductive material molded onto the insulating material in the molding process. The second member forms a second part of the support surface. The substrate electrically insulates the first member from the second member. The first and second members dampen vibration and shock at the support surface and allow charging of the device during vehicle motion.

The first member may be formed as a first integral, unitary, conductive structure including a first base portion and a first set of surface-defining portions. Each of the first set of the surface-defining portions and the first base portion may include particles of a first filler dispersed therein in a concentration sufficient to provide a substantially continuous conductive path in the first member.

The second member may be formed as a second integral, unitary, conductive structure including a second base portion and a second set of surface-defining portions. Each of the second set of surface-defining portions and the second base portion may include particles of a second filler disbursed therein in a concentration sufficient to provide a substantially continuous conductive path in the second member.

The first and second sets of surface-defining portions may be sized, shaped and arranged laterally adjacent to each other in a pattern at the support surface in relation to a predetermined distribution of contacts on the device to achieve wireless conductive power transfer to the device in various positions and orientations of the device when supported on the support surface.

Still further in carrying out the above object and other objects of at least one embodiment of the present invention, a conductive charging pad having a dampening support surface capable of wirelessly and conductively charging an electrical device arbitrarily positioned and supported on the surface is provided. The pad includes a substrate molded from an insulating material in a molding process. A dampening first member is bonded to the substrate and is formed from a first non-metallic conductive material molded onto the insulating material in the molding process. The first member forms a first part of the support surface. A dampening second member is bonded to the substrate and is formed from a second non-metallic conductive material molded onto the insulating material in the molding process. The second member forms a second part of the support surface. The substrate electrically insulates the first member from the second member. The first and second members dampen vibration and shock at the support surface and allow charging of the device.

The first member may be formed as a first integral, unitary, conductive structure including a first base portion and a first set of surface-defining portions. Each of the first set of the surface-defining portions and the first base portion may include particles of a first filler dispersed therein in a concentration sufficient to provide a substantially continuous conductive path in the first member.

The second member may be formed as a second integral, unitary, conductive structure including a second base portion and a second set of surface-defining portions. Each of the second set of surface-defining portions and the second base portion may include particles of a second filler disbursed therein in a concentration sufficient to provide a substantially continuous conductive path in the second member.

The first and second sets of surface-defining portions may be sized, shaped and arranged laterally adjacent to each other in a pattern at the support surface in relation to a predetermined distribution of contacts on the device to achieve wireless conductive power transfer to the device in various positions and orientations of the device when supported on the support surface.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
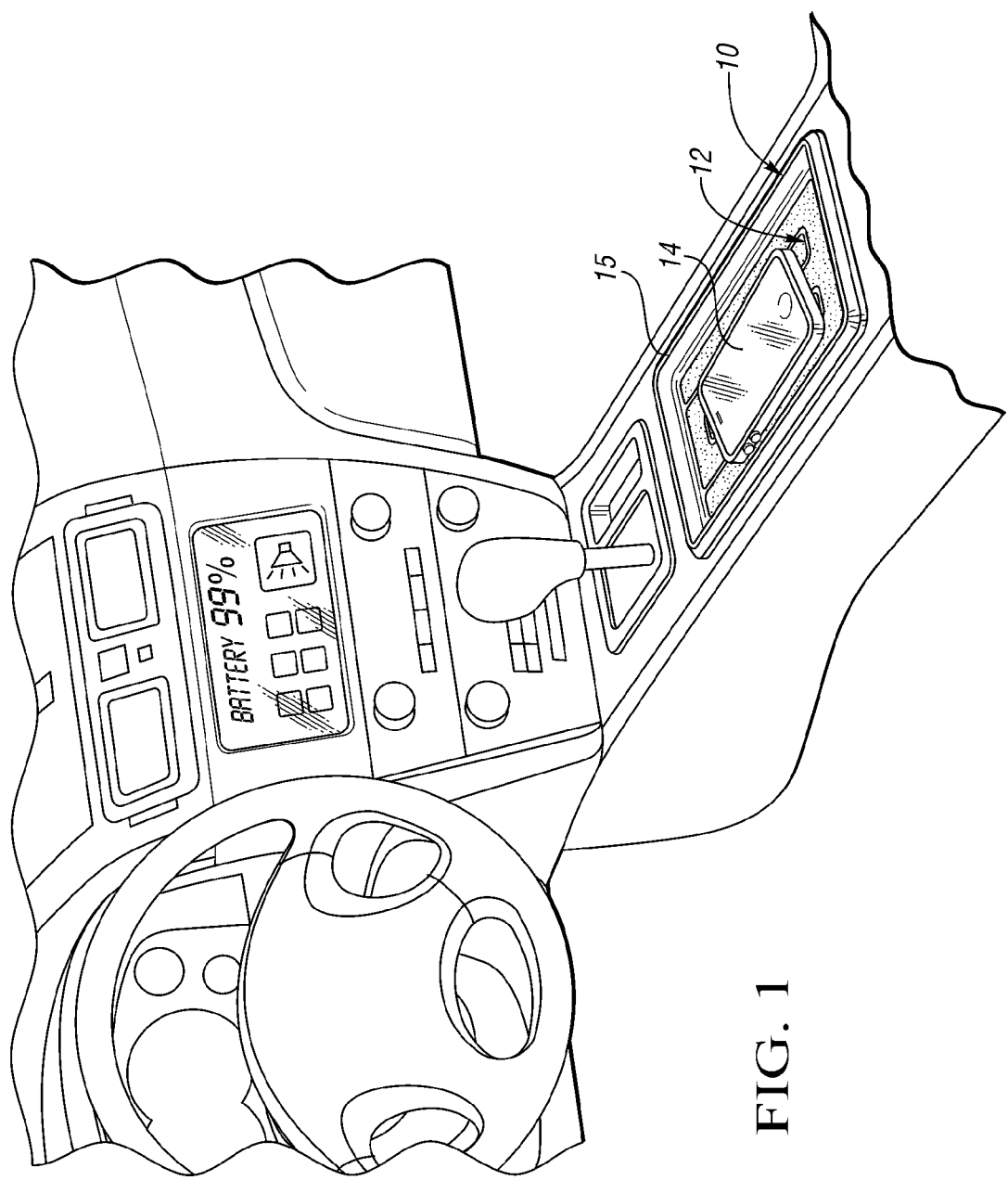
FIG. 1 is an environmental view, partially broken away, of an automotive vehicle interior including a plastic part constructed in accordance with at least one embodiment of the present invention.
Figure 4:
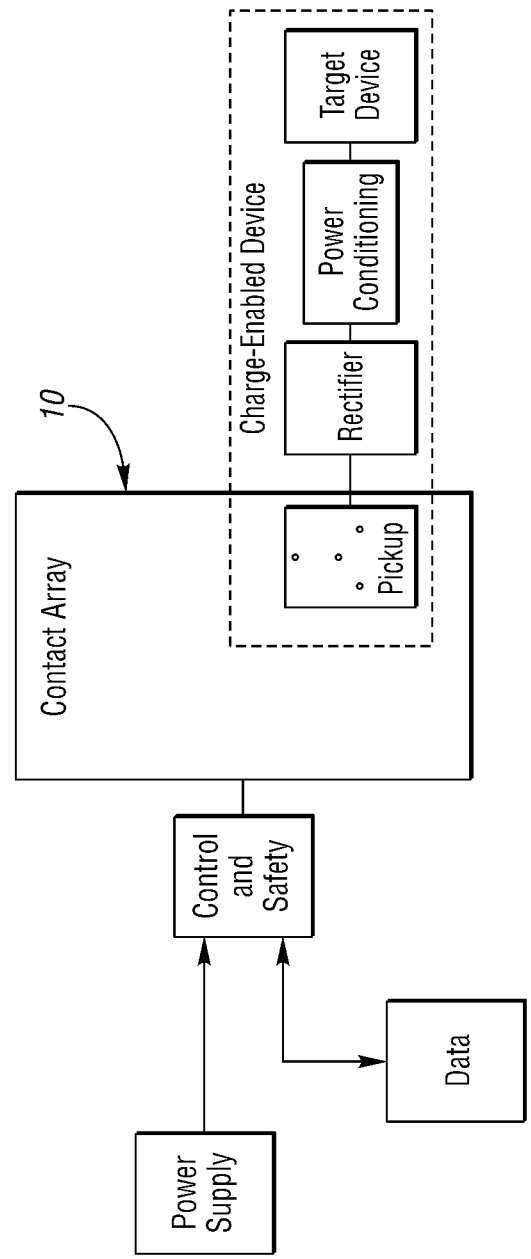
FIG. 4 is a schematic block diagram, partially broken away, of a combined charging and data transfer system including a prior art charge-enabled device and further including the contact array of the plastic part of FIG. 1, electrically coupled to a power supply and a data source or destination to transfer electrical power and data between the part and the device.

Referring now to FIG. 1, an automotive vehicle interior plastic part constructed in accordance with at least one embodiment of the present invention is generally indicated at 10. The part 10 includes an anti-vibration and anti-shock (i.e. dampening) support surface, generally indicated at 12, capable of supplying electrical power to an electrically-powered device 14 when the device 14 is supported on the surface 12 and the vehicle is either at rest or in motion. Also, the support surface 12 may transfer data to and from the device 14 as shown in FIG. 4. An upwardly extending outer peripheral wall portion 15 may or may not be integrally formed with and extend about the support surface 12.

Figure 2:
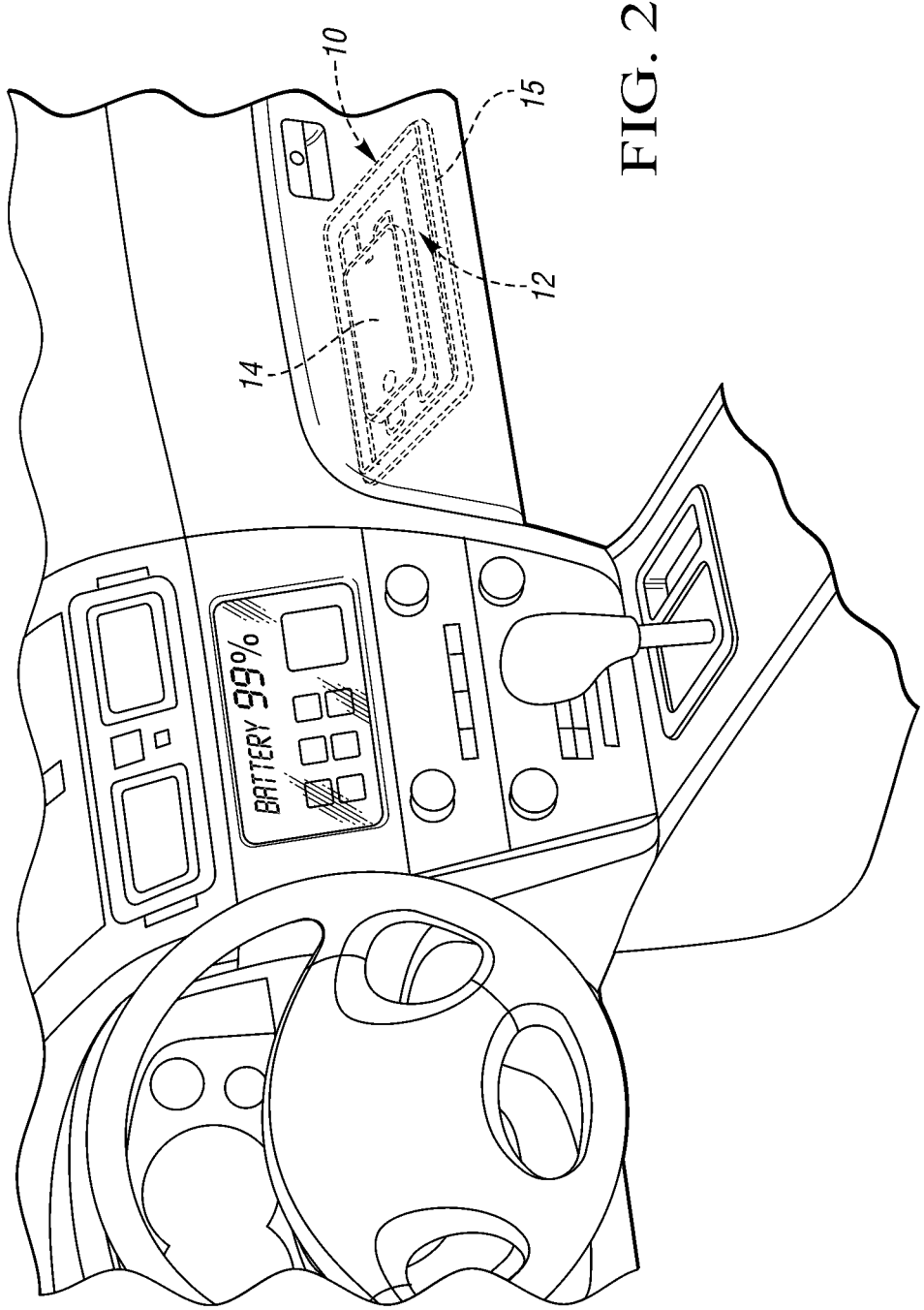
FIG. 2 is a view similar to the view of FIG. 1 but with the plastic part located in a covered, relatively inaccessible area.
Figure 3:
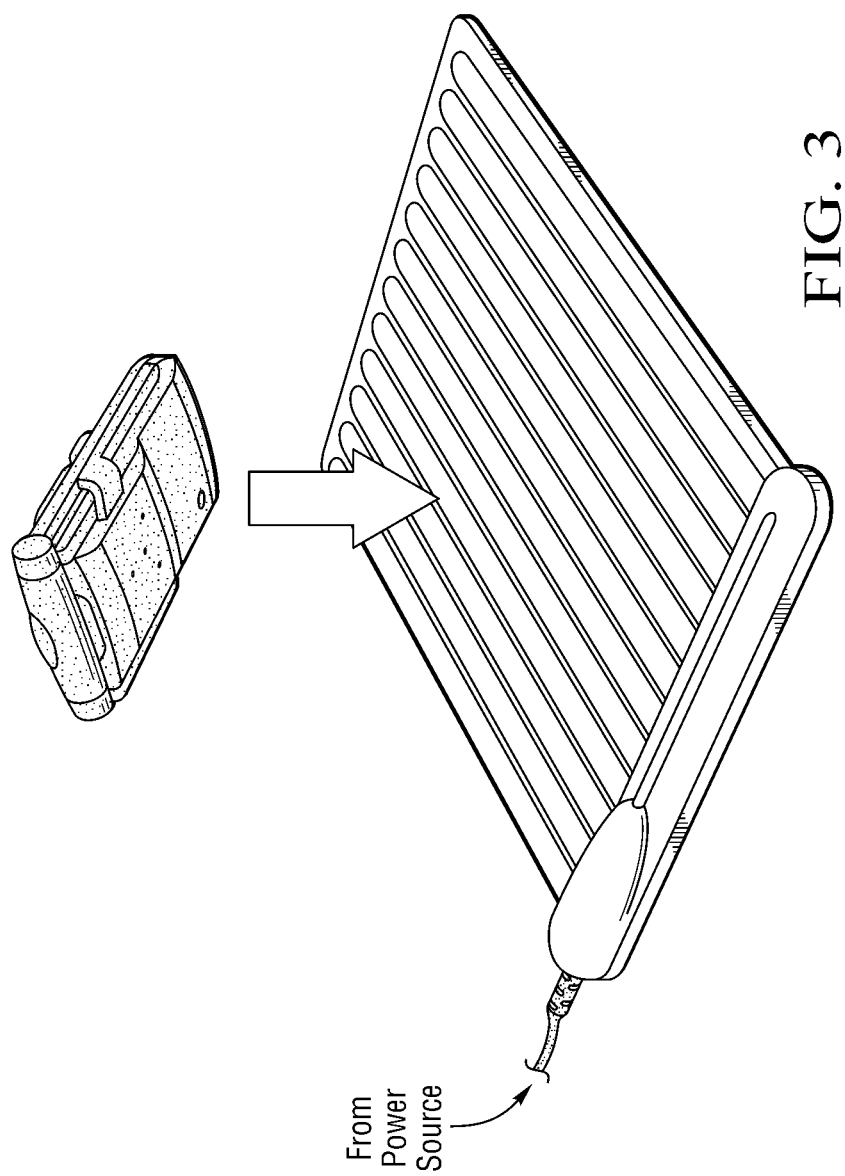
FIG. 3 is a perspective view, partially broken away, of a prior art charging pad, which includes a power delivery support surface, and an electronic device to be charged shown above the surface.

FIG. 2 is a view similar to the view of FIG. 1 but with the part 10 located in a relatively inexcessible location such as in the glove compartment of the vehicle. FIG. 4 shows the part 10 in a system to enable charging and data transfer.

Figure 6:
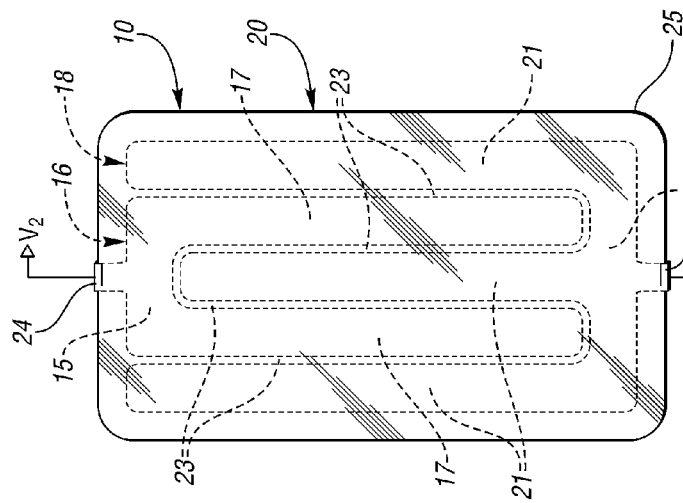
FIG. 6 is a bottom view of the part of FIG. 5.
Figure 7:
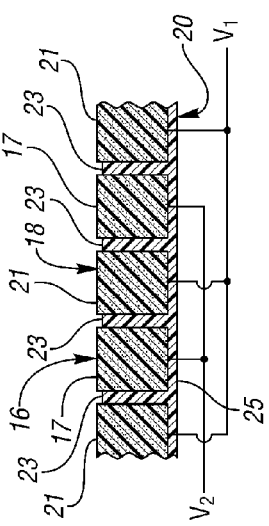
FIG. 7 is a view, partially broken away and in cross section, taken along the lines 7-7 of FIG. 5.
Figure 5:
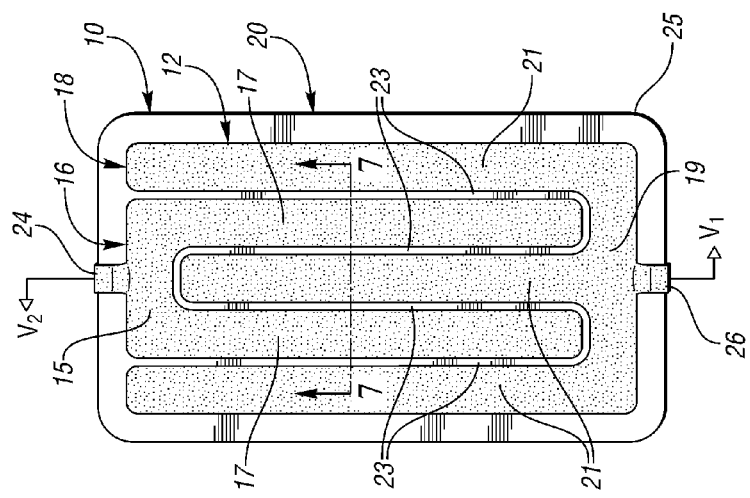
FIG. 5 is a top plan view of the plastic part constructed in accordance with at least one embodiment of the present invention.

Referring now to FIGS. 5, 6 and 7, the part 10 includes first and second conductive anti-vibration and anti-shock (i.e. dampening) elastomeric members, generally indicated at 16 and 18, respectively, that comprise at least part of the support surface 12. The members 16 and 18 are preferably made of at least one plastic such as an electrically conductive elastomer such as a thermoplastic elastomer (TPE). However, one or more other types of plastic such as conductive elastomers which have anti-vibration and anti-shock (i.e. dampening) properties while allowing the surface 12 to supply or transfer electrical power and/or data to supported electrical/electronic devices during vehicle motion may be used instead of TPEs.

The first member 16 is preferably formed as an integral, unitary, conductive molded part or structure from a conductive thermoplastic or elastomeric composite including an electrically conductive first filler in one or more molding processes or operations. However, it is to be understood that the first member 16 (as well as the second member 18) may be formed in an injection molding process such as overmolding where the overmolds 16 and 18 are molded onto a non-conductive plastic substrate, generally included at 20. The resulting overmolded part 10 may be made by insert molding or multi-shot injection molding. The plastic of the substrate 20 is chosen so that it is relatively rigid and bonds or adheres to the overmolds 16 and 18. The substrate 20 may be made of polyolefins, such as polypropylene and polyethylene or engineering resins such as PC, ABS, acetal and nylon.

The first member 16 includes a first base portion 15 and a first set of surface-defining portions 17 partially defining the support surface 12 and bonded to the first base portion 15. Each of the first set of surface-defining portions 17 includes particles of the first filler dispersed therein in a concentration sufficient to provide a substantially continuous conductive path in the first members 16.

The second member 18 is also formed as a unitary molded part from a conductive thermoplastic composite including an electrically conductive second filler in the molding process or operation. The second member includes a second base portion 19 and a second set of surface-defining portions 21 which partially define the support surface 12 and bonded to the second base portion 15. Each of the second set of surface-defining portions 21 include particles of the second filler dispersed therein in a concentration sufficient to provide a substantially continuous conductive path in the second member 18. The members 16 and 18 are preferably formed from substantially the same conductive elastomeric composite.

The members 16 and 18 are typically bonded to the substrate 20 in an overmolding injection molding process so that the first set of surface-defining portions 17 are spaced apart and electrically isolated from the second set of surface-defining portions 21 to allow the first and second sets of surface defining portions 17 and 21, respectively, to be biased at first and second different voltage levels, respectively, at the same time. The first and second sets of surface-defining portions 17 and 21, respectively, allow wireless power (and possibly data) transfer to a portable electronic device supported on the support surface 12. During molding the first and second fillers, respectively, tend to migrate towards the outer surfaces of their respective members 16 and 18. The base portions 15 and 19 may be formed with their respective surface-defining portions 17 and 21 in one or two shots of a multi-shot injection molding operation.

As previously mentioned, the part 10 also includes the non-conductive or insulating unitary, plastic substrate 20 bonded to the first and second members 16 and 18, respectively. The substrate 20 may have anti-vibration and anti-shock properties but is not conductive. The substrate 20 includes a plurality of interconnected, non-conductive or insulating strip portions 23 integrally formed with a common planar base portion 25. The portions 23 of the substrate 20 electrically insulate the first set of surface-defining portions 17 from the second set of surface-defining portions 21 and are preferably made of a non-conductive thermoplastic elastomer (TPE). However, other types of non-conductive thermoplastic having anti-vibration and anti-shock (i.e. dampening) properties may be used.

The first and second members 16 and 18, respectively, include first and second integrally formed, conductive plastic coupling portions 24 and 26, respectively. The first coupling portion 24 is electrically coupled to each of the first set of surface-defining portions 17 and the first base portion 15 and the second coupling portion 26 is electrically coupled to each of the second set of surface-defining portions 21 and the second base portion 19. The first and second coupling portions 24 and 26, respectively, form separate conductive pathways and are operable for biasing the first and second sets of surface-defining portions 17 and 21, respectively, at different voltage levels, respectively. One voltage level may be a positive voltage level and the other voltage level may be a positive voltage level less than the one voltage level, a ground voltage level, or a negative voltage level.

The first and second sets of surface-defining portions 17 and 21, respectively, are sized, shaped and arranged laterally adjacent to each other in a pattern at the support surface 12 in relation to a predetermined distribution of contacts of the device 14 to achieve conductive power (and possibly data) transfer to the device 14 at various positions and orientations of the device 14 when supported on the support surface 12 while the vehicle is at rest or in motion.

As previously mentioned, the first set of surface-defining portions 17 are integrally formed with the first common conductive spine or base (i.e., TPE) portion 15 for coupling the first set of surface-defining portions 17 together. The first member 16 is U-shaped. The second set of surface-defining portions 21 also includes the second common conductive spine or base (i.e., TPE) portion 19 for coupling the second set of surface-defining portions 21 together. The second member 18 is comb-shaped or E-shaped.

The first common spine or base portion 15 together with the first set of surface-defining portions 17 and the first coupling portion 24 form a first integral, unitary, conductive structure. The second common spine base portion 19 together with the second set of surface-defining portions 21 and the second coupling portion 26 form a second integral, unitary, conductive structure. The first set of surface-defining portions 17 comprise finger portions which are interdigitated with the second set of surface-defining portions 21 which also comprise finger portions.

Thermoplastic elastomers (TPEs) are a class of polymers that behave like thermoset rubber but that, above their melt or softening temperatures, are melt processable via thermoplastic processing methods and can be easily reprocessed and remolded. The ability to process these materials with thermoplastic methods allows for design and fabrication freedom.

Bondable thermoplastic elastomer compounds may be formulated to provide a chemical bond to plastic substrates, such as TPE substrates, making possible simpler part designs that are less dependent on mechanical interlocks or require time consuming surface preparation during production.

These compounds are compatible with insert or multi-shot molding methods and are ideal for applications where a "soft-touch" feature can provide an ergonomic touch or enhance consumer appeal, dampen sound or vibration, or provide impact or shock protection. Also, such compounds are elastic.

A thermoplastic elastomer (TPE) of at least one embodiment of the present invention may be selected from the group consisting of a thermoplastic polyolefin, thermoplastic urethane, polyester, polycarbonate, acrylonitrile/butadiene/styrene ("ABS"), polypropylene, lomod, bexloy, mixture of acrylonitrile/butadiene/styrene (i.e., ABS) and polycarbonate, and mixtures thereof.

A preferred base polymer for the various dampening parts or portions of the part 10 may be any suitable base polymer that displays rubber-like elasticity, such as an unsaturated or saturated rubber material including, but not limited to, a nitrile rubber such as a hydrogenated nitrile butadiene rubber (HNBR). However, other acceptable materials include but are not limited to fluoroelastomers, carboxylated nitrile butadiene rubber, nitrile butadiene rubber and ethylene acrylic rubber.

Conductive plastic compounds such as TPEs of at least one embodiment of the present invention have a number of advantages over metals or surfactant coatings. Finished parts are lighter in weight, easier to handle, and less costly to ship. Their fabrication is usually easier and less expensive due to the elimination of secondary processes, and they are not subject to denting, chipping and scratching.

Conductive compounds can be colored for aesthetic purposes, eliminating the need for secondary color processes, such as painting.

The conductive loaded resin-based material of at least one embodiment of the present invention may include micron conductive powder(s), conductive fiber(s), or a combination of conductive powder and conductive fibers in a base resin host. The percentage by weight of the conductive powder(s), conductive fiber(s), carbon nanotubes, or a combination thereof may be between about 20% and 50% of the weight of the conductive loaded resin-based material. The micron conductive powders may be formed with non-metals, such as carbon, carbon black, graphite, that may also be metallic plated, or the like, or from metals such as stainless steel, nickel, copper, silver, that may also be metallic plates, or the like, or from a combination of non-metal, plated, or in combination with, metal powders. The micron conductor fibers preferably are of nickel-plated carbon or graphite fiber, stainless steel fiber, copper fiber, silver fiber, aluminum fiber, or the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automotive vehicle interior plastic part having a dampening support surface capable of wirelessly and conductively allowing electrical signals to travel between the part and an electrical device arbitrarily positioned and supported on the surface, the part comprising:
    a substrate molded from an insulating material in a molding process;
    a dampening first member bonded to the substrate and formed from a first non-metallic conductive material molded onto the insulating material in the molding process, the first member forming a first part of the support surface; and
    a dampening second member bonded to the substrate and formed from a second non-metallic conductive material molded onto the insulating material in the molding process, the second member forming a second part of the support surface, wherein the substrate electrically insulates the first member from the second member and wherein the first and second members dampen vibration and shock at the support surface and allow electrical signals to travel between the part and the device during vehicle motion.

2. The part as claimed in claim 1, wherein the electrical signals include electrical power signals and wherein the device includes a rechargeable battery.

3. The part as claimed in claim 1, wherein the electrical signals provide data communication between the part and the device.

4. The part as claimed in claim 1, wherein the molding process is an injection molding process.

5. The part as claimed in claim 4, wherein the injection molding process comprises an insert molding process.

6. The part as claimed in claim 4, wherein the injection molding process comprises a multi-shot molding process.

7. The part as claimed in claim 1, wherein each of the first and second non-metallic conductive materials comprises an electrically conductive elastomer.

8. The part as claimed in claim 7, wherein each of the electrically conductive elastomers comprises an electrically conductive thermoplastic elastomer.

9. The part as claimed in claim 1, wherein the first member is formed as a first integral, unitary, conductive structure including a first base portion and a first set of surface-defining portions, each of the first set of the surface-defining portions and the first base portion including particles of a first filler dispersed therein in a concentration sufficient to provide a substantially continuous conductive path in the first member.

10. The part as claimed in claim 9, wherein the second member is formed as a second integral, unitary, conductive structure including a second base portion and a second set of surface-defining portions, each of the second set of surface-defining portions and the second base portion including particles of a second filler disbursed therein in a concentration sufficient to provide a substantially continuous conductive path in the second member.

11. The part as claimed in claim 10, wherein the first and second sets of surface-defining portions are sized, shaped and arranged laterally adjacent to each other in a pattern at the support surface in relation to a predetermined distribution of contacts on the device to achieve wireless conductive signal transfer between the device and the part in various positions and orientations of the device when supported on the support surface.

12. The part as claimed in claim 10, wherein the first conductive structure includes a first coupling portion electrically coupled to the first base portion and being operable for biasing the first set of surface-defining portions at a first voltage level.

13. The part as claimed in claim 12, wherein the second conductive structure includes a second coupling portion electrically coupled to the second base portion and being operable for biasing the second set of surface-defining portions at a second voltage level different from the first voltage level.

14. The part as claimed in claim 10, wherein the first and second sets of surface-defining portions are interdigitated.

15. A vehicular charging pad having a dampening support surface capable of wirelessly and conductively charging an electrical device arbitrarily positioned and supported on the surface, the pad comprising:
a substrate molded from an insulating material in a molding process;
a dampening first member bonded to the substrate and formed from a first non-metallic conductive material molded onto the insulating material in the molding process, the first member forming a first part of the support surface; and
a dampening second member bonded to the substrate and formed from a second non-metallic conductive material molded onto the insulating material in the molding process, the second member forming a second part of the support surface, wherein the substrate electrically insulates the first member from the second member and wherein the first and second members dampen vibration and shock at the support surface and allow charging of the device during vehicle motion.

16. The pad as claimed in claim 15, wherein the first member is formed as a first integral, unitary, conductive structure including a first base portion and a first set of surface-defining portions, each of the first set of the surface-defining portions and the first base portion including particles of a first filler dispersed therein in a concentration sufficient to provide a substantially continuous conductive path in the first member.

17. The pad as claimed in claim 16, wherein the second member is formed as a second integral, unitary, conductive structure including a second base portion and a second set of surface-defining portions, each of the second set of surface-defining portions and the second base portion including particles of a second filler disbursed therein in a concentration sufficient to provide a substantially continuous conductive path in the second member.

18. The pad as claimed in claim 17, wherein the first and second sets of surface-defining portions are sized, shaped and arranged laterally adjacent to each other in a pattern at the support surface in relation to a predetermined distribution of contacts on the device to achieve wireless conductive power transfer to the device in various positions and orientations of the device when supported on the support surface.

19. A conductive charging pad having a dampening support surface capable of wirelessly and conductively charging an electrical device arbitrarily positioned and supported on the surface, the pad comprising:
a substrate molded from an insulating material in a molding process;
a dampening first member bonded to the substrate and formed from a first non-metallic conductive material molded onto the insulating material in the molding process, the first member forming a first part of the support surface; and
a dampening second member bonded to the substrate and formed from a second non-metallic conductive material molded onto the insulating material in the molding process, the second member forming a second part of the support surface, wherein the substrate electrically insulates the first member from the second member and wherein the first and second members dampen vibration and shock at the support surface and allow charging of the device.

20. The pad as claimed in claim 19, wherein the first member is formed as a first integral, unitary, conductive structure including a first base portion and a first set of surface-defining portions, each of the first set of the surface-defining portions and the first base portion including particles of a first filler dispersed therein in a concentration sufficient to provide a substantially continuous conductive path in the first member.

21. The pad as claimed in claim 20, wherein the second member is formed as a second integral, unitary, conductive structure including a second base portion and a second set of surface-defining portions, each of the second set of surface-defining portions and the second base portion including particles of a second filler disbursed therein in a concentration sufficient to provide a substantially continuous conductive path in the second member.

22. The pad as claimed in claim 21, wherein the first and second sets of surface-defining portions are sized, shaped and arranged laterally adjacent to each other in a pattern at the support surface in relation to a predetermined distribution of contacts on the device to achieve wireless conductive power transfer to the device in various positions and orientations of the device when supported on the support surface.

\* \* \* \* \*